United States Patent [19]

Polaner

[11] 3,954,092
[45] May 4, 1976

[54] FEED TUBE FLAME ARRESTER

[75] Inventor: Mardy Polaner, Birmingham, Mich.

[73] Assignee: Barbron Corporation, Detroit, Mich.

[22] Filed: Apr. 28, 1975

[21] Appl. No.: 572,283

Related U.S. Application Data

[60] Continuation-in-part of Ser. No. 387,906, Aug. 3, 1973, Pat. No. 3,889,649, which is a division of Ser. No. 177,235, Sept. 2, 1971, abandoned.

[52] U.S. Cl. ................................ 123/142; 123/141; 123/120; 123/121; 123/127; 123/139 AH; 123/119 B; 48/180 M
[51] Int. Cl.² ................. F02M 17/00; F02M 25/06; F02M 29/00
[58] Field of Search................ 123/141, 142, 198 D, 123/139 AH, 120, 121; 48/180 M, 127

[56] References Cited
UNITED STATES PATENTS

| | | | |
|---|---|---|---|
| 504,260 | 8/1893 | Worth | 123/141 |
| 1,121,868 | 12/1914 | Riothe et al. | 123/141 |
| 1,122,038 | 12/1914 | Smith | 123/141 |
| 1,500,103 | 7/1924 | Burdon et al. | 48/180 M UX |
| 1,735,694 | 11/1929 | Remington | 123/119 B |
| 1,847,457 | 3/1932 | Zeibig et al. | 123/139 AH |
| 2,384,681 | 9/1945 | Janes | 123/141 |

*Primary Examiner*—Charles J. Myhre
*Assistant Examiner*—Ira S. Lazarus
*Attorney, Agent, or Firm*—Krass & Young

[57] ABSTRACT

A feed line for conveying gasoline from the air side of an engine diaphragm fuel pump to the intake manifold consists of a tube having an interior strip with a width equal to that of the inside diameter of the tube wound into a spiral along its length and fixed within the tube. The feed tube allows the return of fuel reaching the air side of the diaphragm of the fuel pump to the engine in the event of rupture of the diaphragm, without the danger of backfire. The introduction of the unatomized fuel into the intake manifold directly or through the wall of the carburetor causes a disruption in smooth engine operation to signal the operator of a disorder.

3 Claims, 3 Drawing Figures

FEED TUBE FLAME ARRESTER

REFERENCE TO RELATED APPLICATIONS

This application is a continuation-in-part of application Ser. No. 387,906, filed Aug. 3, 1973 now U.S. Pat. No. 3,889,649. Application Ser. No. 387,906 is a divisional of application Ser. No. 177,235, filed Sept. 2, 1971, now abandoned.

BACKGROUND OF THE INVENTION

1. Field of the Invention

The present invention relates to the use of a feed tube with an internal flame arrester to connect the air side of a diaphragm fuel pump to the intake manifold either directly or through the wall of the carburetor of an engine for the purpose of disposing of fuel accumulating as a result of diaphragm rupture.

2. Prior Art

In an internal combustion engine fuel is commonly moved from a tank to the combustion area by a diaphragm fuel pump. If the diaphragm ruptures, fuel will escape from the fuel side of the pump into the air side and cause a potentially hazardous accumulation of combustible gases. It is desirable to safely dispose of the fuel to prevent the generation of these gases and at the same time to warn the operator of the disorder in the fuel system.

One means of accomplishing this result has been to connect the air side of the diaphragm fuel pump to the intake manifold. The flow passage used must prevent backfire from the manifold to the pump.

Feed tubes with internal flame arresters that have been applied to this problem have heretofore typically emplpoyed masses of metallic fibers, either woven in the form of a mesh, or unwoven, disposed in the gas feed tube. Such elements tend to act as filters and may eventually clog and prevent the free flow of fuel. Moreover, as such fiber surfaces become coated with materials which filter out of the gasoline, their flame arresting action may be diminished by virtue of the combustibility of these filtered materials.

SUMMARY OF THE INVENTION

The present invention contemplates connecting the air side of an engine diaphragm fuel pump to the intake manifold directly or through the wall of the carburetor through a feed tube having an internal flame arrester that provides minimal impedance to the flow of gasoline or combustible gases. The flame arrester used in the tube is extremely simple in construction, so as to be low in cost and reliable in operation, and provides excellent flame arresting action.

The invention broadly takes the form of a feed tube connected at one end to a port in the air side of an engine diaphragm fuel pump and at the other end to a port in the intake manifold. At least the manifold end of the feed tube incorporates a flame arresting device. The flame arrester is formed on the interior of the tubing, and consists of a longitudinally aligned baffle which gradually spirals about the central axis of the tube. The baffle is formed of an elongated strip of a thin metal sheet, preferably having a high thermal conductivity such as brass. The strip has a width substantially equal to the interior diameter of the tubing and its edges are affixed to diametrically opposed points in the interior of the tubing. This construction results in a pair of feed paths which spiral along the length of the strip.

Fuel or combustible gases passing through such flame arresters follow a spiral path and flow in a substantially nonlaminar manner with the strip continually being impacted by the fluid or gases and forcing them to the spiral path. This continual scouring prevents the walls from supporting any substantial build-up of dirt and grit which may be contained in the passing fuel and/or gases.

If the fuel passing through the manifold end of the feed tube becomes ignited the resultant flame passing into the tube is either diffused into two separate sections, or only propogates through one-half of the dual spiral passage through the tube. In either event, the flame's impact against the spiral strip tends to conduct its heat into the other two walls and thereby quench the flame. If the flame only occupies one of the twin passages it is quickly cooled by conduction of heat into the cooler gases passing through the opposite passage. Accordingly, flame arresters of this type have proved to be quite effective in the application of the present invention.

A further attribute of the use of the aforedescribed flame arrester is the capability to condense a combustible gas at the manifold end of the feed tube. At the manifold, the baffle strip is carried beyond the end of the feed tube and bent downwardly in the direction of the passage through the combustion chambers. Gases passing out will tend to be condensed on the strip by the relatively cool air in the manifold. Once condensed, they will drip into the passage toward the combustion chambers. This will cause an over-rich fuel mixture and resultant rough engine operation, but this condition will serve as a warning to the operator that the engine is not operating properly. In any event, the potentially dangerous fumes are safely contained within the engine system.

Other objectives, advantages and applications of the present invention will be made apparent by the following detailed description of the preferred embodiment of the invention. The description makes reference to the accompanying drawings in which.

Figure 1:
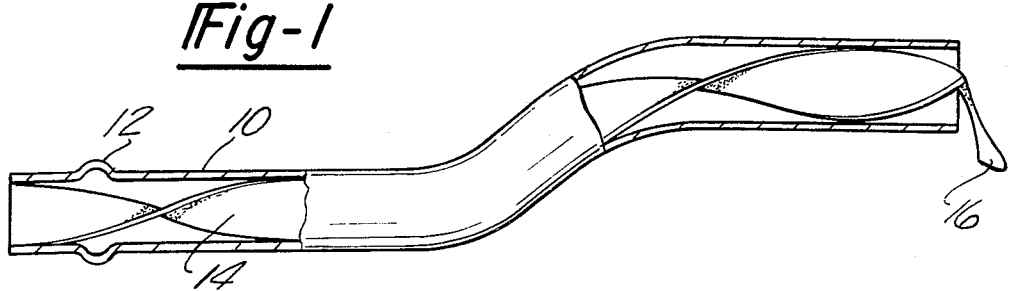
FIG. 1 is a view of a feed tube flame arrester utilized in the present invention with sections broken away to better illustrate the interior spiral.

Referring to FIG. 1, a feed tube flame arrester of the type employed in the present invention utilizes a section of tubing 10 which is circular in cross seciton. The tubing is preferably formed of a metal having good thermal conductivity such as brass and in a typical application in connection with whether an internal combustion engine may have an outer diameter of 0.250 inch and a wall thickness of 0.032 inch.

The tubing 10 has a bulge 12 adjacent one end so that a suitable hose may be inserted over the tube and coupled thereto with a standard hose coupling member.

An interior flame arresting baffle 14 is formed of an elongated strip of a thermally conductive metal such as brass which may have a developed length slightly in excess of the tube section. The strip 14 has a width substantially equal to the interior diameter of the tube 10. The strip is spiralled about its longitudinal axis so that it makes a 180° turn in slightly less than 1 inch.

The strip 14 is disposed within the tube 10 so that its edges are in abutment with the side wall so as to effectively form a pair of spiral parallel separated passages through the tube. One end of the strip is flush with the end of the tube 10 adjacent to the bulge 12, and the strip 14 projects beyond the other end of the tube 10 and is bent at right angles thereto so as to form tongue 16.

Figure 2:
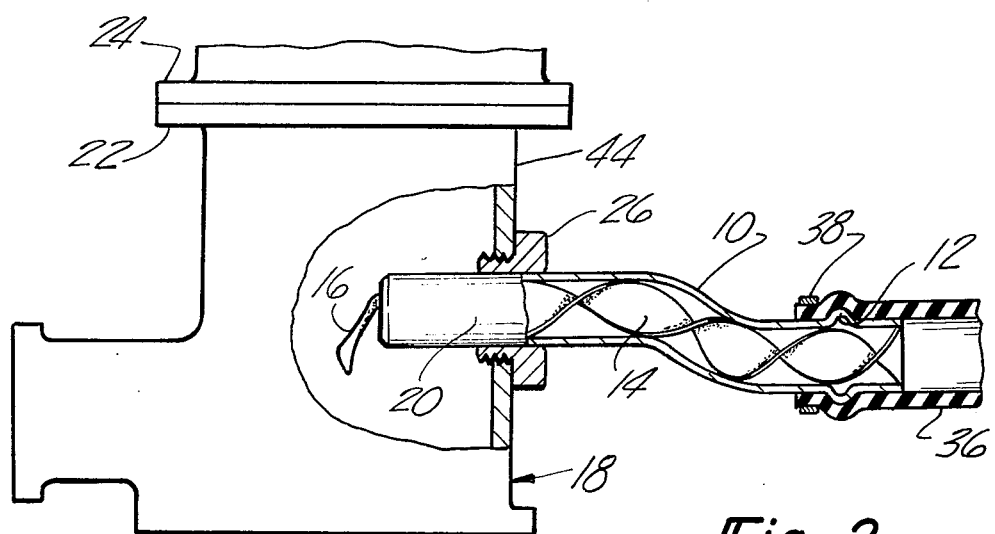
FIG. 2 is a sectional view of an intake manifold in an internal combustion engine showing the flame arresting portion of the feed tube as it is connected to the manifold.

FIG. 2 illustrates the manner in which the tube 10 may be connected to the intake manifold, generally indicated at 18, of an internal combustion engine.

The intake manifold 18 is mounted atop the engine, generally indicated at 40. Upper flange 22 abuts carburetor flange 24 and provides means for supporting the carburetor 44.

The tube 10 enters the port 20 and projects radially inward toward the center of intake manifold 18. The tube 10 is affixed in this position by engagement with bushing 26. The tongue 16 projects downwardly toward the passage to the engine combustion chambers (not shown). A rubber feed tube 36 connects to the input end of the tube 10 with a suitable hose clamp 38 retaining the tube 36 about the bulge 12.

Figure 3:
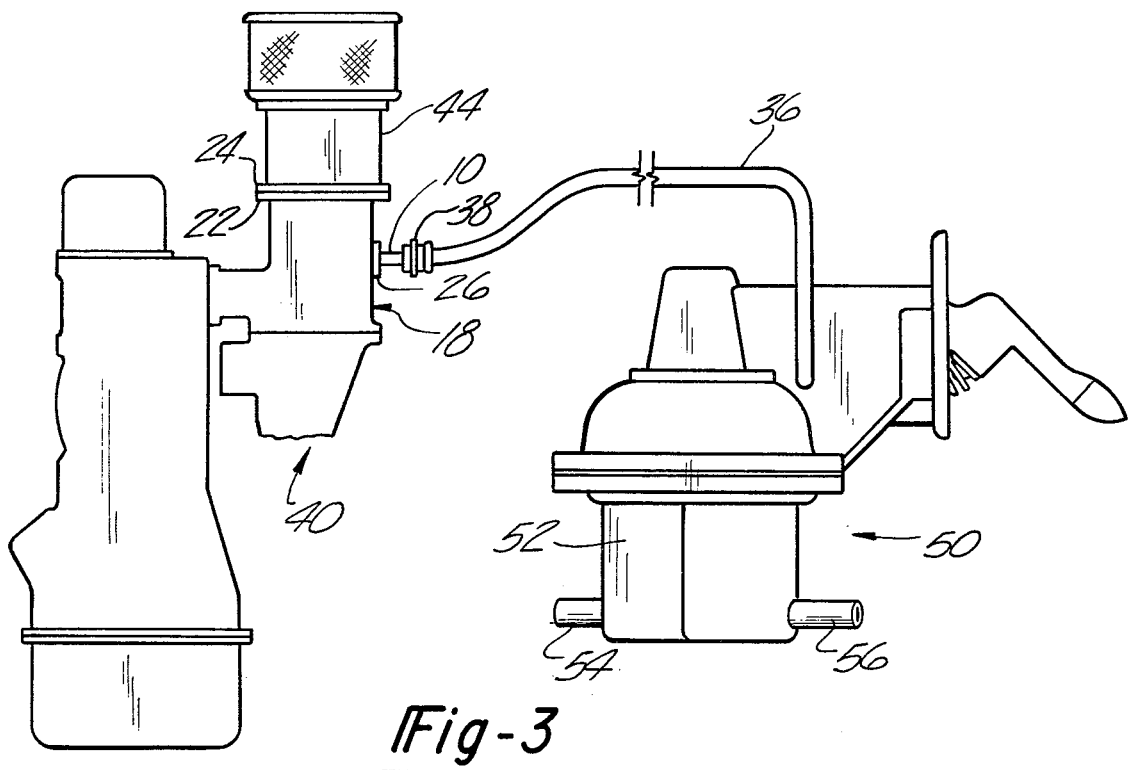
FIG. 3 is an illustration of the preferred embodiment of the invention showing the air side of a diaphragm fuel pump being ventilated into the intake manifold of the engine.

FIG. 3 illustrates the feed tube as incorporated in an internal combustion engine 40 to dispose of combustible fumes ventilated from the air side of an engine diaphragm fuel pump, generally indicated at 50. The fuel pump 50 has a chamber 52 supplied by an input fuel line 54 and an output line 56. The upper or air side of line the diaphragm 50 is vented by a feed line 36 which connects to the intake manifold 18 in the same manner as shown in FIG. 3. This achieves venting of the air side of the fuel pump 50.

Should the diaphragm of the fuel pump 50 rupture, the fumes and fuel in the air side of pump 50 will pass into the intake manifold 18 through the tube 10. The fuel tends to condense on the tongue 16 because of the relatively cool air within the intake manifold 18 and then drip into the passage to the combustion chambers. The introduction of this undiluted fuel into the combustion chamber will cause the engine fuel mixture to be extraordinarily rich and result in a disruption of smooth engine performance. This disruption will alert the operator to a disorder in the fuel supply system.

If the engine 40 tends to backfire, as sometimes happens, any flame attempting to traverse the tube 10 will be forced to follow a spiral path between the sides of the strip 14 and the interior diameter of the tube 10 and its temperature will be quickly lowered by the dissipation of the heat through the strip and the tube to the point where the flame will be quenched. The flame will normally be quenched in one of the two spiral paths before the other and the induction of heat into the relatively cool intake manifold passage will quickly quench the flame in the other spiral path.

Emperical study has determined that a flame arrester of at least 3 inches having the internal strip spiralled about its longitudinal axis 180° every inch is sufficient to prevent the passage of flames. The exact configuration in terms of material and dimensions of the tube and the strip will be a function of the gas dynamics. For a relatively large diameter, it will be necessary to have a relatively tight spiral configuration so as to force a flame against the strip surfaces.

The embodiments of the invention in which an exclusive property or privilege is claimed are defined as follows:

1. In a combustion engine having an intake manifold for the passage of fuel to the combustion chamber, a diaphragm fuel pump having an air side and a fuel side, a feed line connecting the air side of the pump to the intake manifold including an elongated section of closed tube having one open end connected to the air side of the pump and the other end to the intake manifold, said tube having an interior flame arresting baffle formed of an elongated strip twisted about its elongated axis and having both of its longitudinal edges fixed to the interior end of the tube so that the longitudinal axis of the strip coincides with the longitudinal axis of the tube and having one end terminating at the intake manifold end of the tube.

2. The feed line of claim 1 wherein said elongated strip extends beyond the end of the tube at the intake manifold.

3. The feed line of claim 1 wherein said elongated strip is at least three inches in length and is twisted about an elongated axis at least 180° per inch.

* * * * *